United States Patent
Turatti

(10) Patent No.: US 8,146,489 B2
(45) Date of Patent: Apr. 3, 2012

(54) SYSTEM FOR TRANSPORTING AND/OR WASHING AND/OR PASTEURISATION THERMAL TREATMENT OF FOODSTUFFS, PARTICULARLY LEAF PRODUCTS

(75) Inventor: Antonio Turatti, Cavarzere (IT)

(73) Assignee: Turatti S.R.L., Cavarzere (IT)

( * ) Notice: Subject to any disclaimer, the term of this patent is extended or adjusted under 35 U.S.C. 154(b) by 100 days.

(21) Appl. No.: 12/777,625

(22) Filed: May 11, 2010

(65) Prior Publication Data
US 2011/0030567 A1    Feb. 10, 2011

Related U.S. Application Data

(63) Continuation-in-part of application No. 11/954,372, filed on Dec. 12, 2007.

(51) Int. Cl.
*A23N 12/08* (2006.01)

(52) U.S. Cl. .................. 99/483; 99/516; 99/517; 62/375

(58) Field of Classification Search .................... 99/483, 99/516, 487, 517, 520, 404; 219/243; 62/375
See application file for complete search history.

(56) References Cited

U.S. PATENT DOCUMENTS

| | | | | |
|---|---|---|---|---|
| 2,057,366 A | * | 10/1936 | Chapman | 99/404 |
| 2,789,057 A | * | 4/1957 | Schwarz | 426/506 |
| 3,994,143 A | | 11/1976 | Bonuchi et al. | |
| 4,636,395 A | | 1/1987 | Robinson, Jr. et al. | |
| 4,814,193 A | | 3/1989 | Shenouda et al. | |
| 4,919,948 A | | 4/1990 | Orr et al. | |
| 4,921,640 A | * | 5/1990 | Wu | 261/76 |
| 5,181,532 A | * | 1/1993 | Brodefors et al. | 137/14 |

FOREIGN PATENT DOCUMENTS

| | | |
|---|---|---|
| EP | 0362975 A | 4/1990 |
| EP | 696842 A1 * | 2/1996 |
| FR | 2852492 A | 9/2004 |
| WO | 2004071220 A1 | 8/2004 |

* cited by examiner

*Primary Examiner* — Henry Yuen
*Assistant Examiner* — Jianying Atkisson
(74) *Attorney, Agent, or Firm* — Gesmer Updegrove LLP

(57) ABSTRACT

The present invention relates to a system for transporting and/or washing and/or pasteurization thermal treatment of foodstuffs, particularly leaf products comprising at least a treatment section. The treatment section can be comprised of one or more sections of rectilinear tubes and one or more corresponding curved tube sections, wherein products within the treatment section being conveyed by a fluid, such as water, flowing along the tubes.

19 Claims, 2 Drawing Sheets

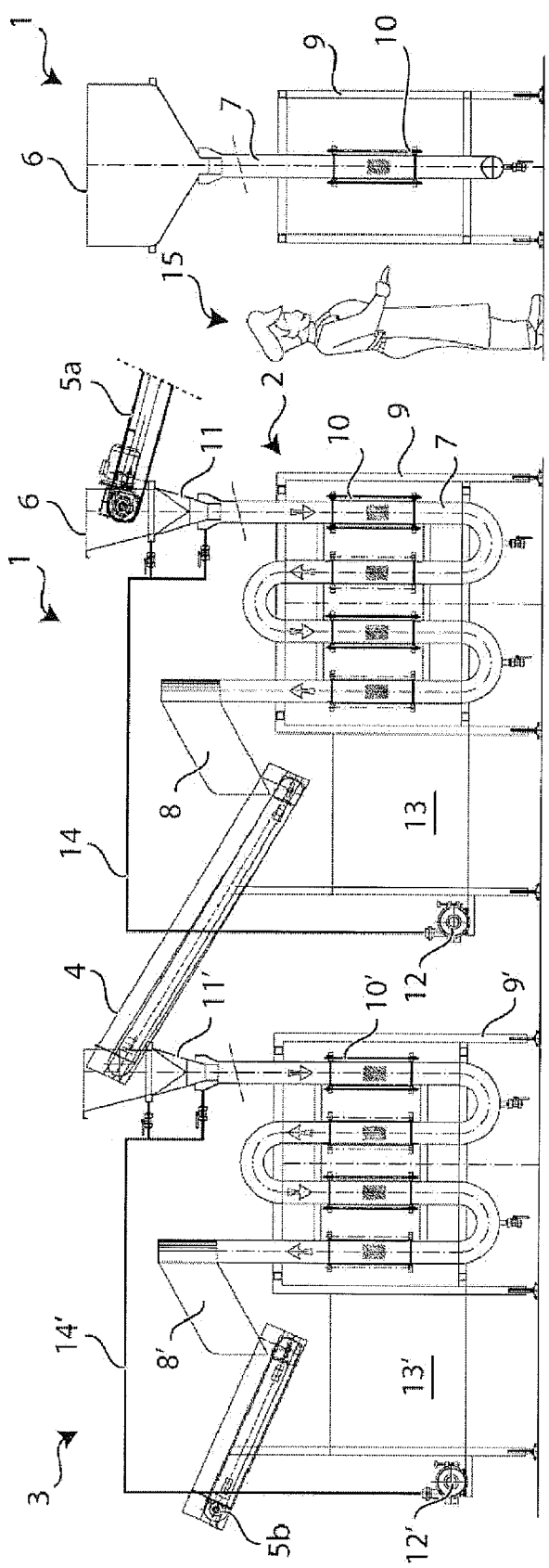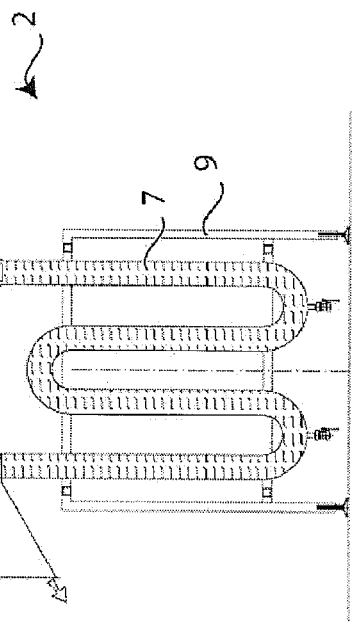
Fig. 1
Fig. 2
Fig. 3

SYSTEM FOR TRANSPORTING AND/OR WASHING AND/OR PASTEURISATION THERMAL TREATMENT OF FOODSTUFFS, PARTICULARLY LEAF PRODUCTS

PRIORITY INFORMATION

The present application is a continuation-in-part of U.S. patent application Ser. No. 11/954,372, filed on Dec. 12, 2007 and claims benefit from Italian Patent Application No. 2006A000703, filed on Dec. 27, 2006, all of which is incorporated herein in its entirety.

BACKGROUND OF THE INVENTION

1. Field of the Invention

The present invention concerns a system for transporting and/or washing and/or pasteurisation thermal treatment of foodstuffs, particularly leaf products.

2. Brief Description of the Prior Art

As it is well known, many foodstuff, particularly leaf products, are put on the market fresh with indication "Range IV products" within closed packagings and preferably kept within refrigerator.

These products are subjected to different treatments, according to their final use.

It is also known that these products are easily perishable, and have a very short shelflife, usually not longer than 1 week.

On the basis of the existing rules, the use of any chemical preserving agent is not permitted. However, market needing impose to increase the product shelflife, even maintaining intact the organoleptic characteristics such as odour, taste, colour and freshness.

Bacterial microbiological agents responsible of alteration of foodstuffs are generally bacteria and ferments, both of the aerobic and anaerobic type, living in a community on the foodstuff surface.

Activity of said microbiologic agents depends on their concentration and on different factors, such as acidity (pH), temperature, salinity level and atmosphere composition.

It is known that concentration of bacterial flora present on a foodstuff sample has a variable run according to a logarithmic scale with temperature to which sample is subjected starting from a set starting concentration. Therefore, reducing said starting concentration of the bacterial microbiologic agents on foodstuffs to be preserved before their packaging, it is possible increasing preservation time of the same.

SUMMARY OF THE INVENTION

In view of the above, it is object of the present invention that of suggesting a system permitting subjecting foodstuffs, particularly vegetables, to each treatment required by their final use, gently and softly, without damaging the same product and saving as more as possible power and water.

Another object of the present invention is that of providing a system permitting drastically reducing surface concentration of bacterial flora on surface of foodstuffs, thus extending their conservation period.

Still another object of the invention is that of suggesting a system that can be a modular system.

It is therefore specific object of the present invention a system for transporting and/or washing and/or pasteurisation thermal treatment of foodstuffs, particularly leaf products characterised in that it comprises at least a treatment section, said at least a treatment section being comprised of can be comprised of one or more sections of rectilinear tubes and of one or more corresponding curved tube sections, products within said at least a treatment section being conveyed by a fluid, such as water, flowing along said tubes.

According to the invention, said one or more sections of rectilinear tubes and of one or more corresponding curved tube section can be provided according to a vertical orientation.

Still according to the invention, said one or more sections of rectilinear tubes and of one or more corresponding curved tube section can be provided according to a horizontal orientation.

In a preferred embodiment of the system according to the invention, said system comprises a first treatment section, in which the product to be subjected to treatment is conveyed by said loading means, said first treatment section heating said product by a treatment fluid, so as to reduce starting concentration of thermo sensitive bacteric flora present in the same; and a second treatment section, provided in cascade with said first treatment section, said second treatment section cooling the product by said treatment fluid, so as to stop growing of residual bacteric flora present.

Always according to the invention, each one of said first and second treatment sections can comprise a hopper through which said product is conveyed, and a washing conduct, at one end of which it is coupled said hopper, through which said product passes and is washed by said treatment fluid at a set temperature.

Furthermore, according to the invention said rectilinear tube sections can be aligned or offset each other and comprises transparent stub pipes suitable to permit to an operator to monitor the product flow within said washing conduct.

Always according to the invention, each one of said treatment sections can comprise a Venturi tube element between said hopper and said end of said washing conduct; a pump, connected with said Venturi tube by a further tube, said pump being suitable to pump said treatment fluid within said hopper; and at least a collection basin for said treatment fluid pumped by said pump; said Venturi tube element mixing said product and said treatment fluid pumped by said pump to increase at the same time the speed of the mixture obtained and permitting at the same to reach the second end of said washing conduct.

Still according to the invention, said system can comprise a conveyor belt suitable to convey said product from said first treatment section to said second treatment section, said conveyor belt separating said conveyed product from said treatment fluid and being provided in correspondence of said collection basin for said treatment fluid of said first treatment section, so as the treatment fluid separated from said product is collected within said basin.

Furthermore, according to the invention, said discharge means can be provided in correspondence of said fluid collection basin of said first treatment section, said discharge means separating said product from said treatment fluid and being provided in correspondence of said collection basin for said treatment fluid of said second treatment section, so that treatment fluid separated from said product is collected within said basin.

Advantageously, according to the invention, said system can comprise an inverter connected with said pump, suitable to vary number of revolutions of said pump and adjusting flow rate of said treatment fluid, and thus very precisely adjusting treatment time of said first or second treatment section.

Preferably, according to the invention, each one of said treatment sections can comprise a further hopper for discharging said product.

Always according to the invention, said treatment fluid can comprise water and enzymes with the adding of organic acids suitable to be suitable for food use and/or chemical agents.

Advantageously, according to the invention, said chemical agents can comprise ozone, chlorine or a mixture of ozone and chlorine, and are suitable to decontaminate said product.

Still according to the invention, said first treatment section can comprise a heating system for said treatment fluid contained within said basin, said heating system being an electric system or a gas system or a glycol system or other similar system, comprising a thermostat controlling temperature of said treatment fluid.

Furthermore, according to the invention, said second treatment section can comprise a cooling system for said treatment fluid contained within said basin.

Preferably, according to the invention, said product to be subjected to treatment can be salad or fruit.

Always according to the invention, said first and second treatment sections can be modular sections.

Still according to the invention, said second section can comprise a basin filled in with said low temperature treatment fluid, wherein the product arriving from said first treatment section is placed, and means for withdrawing the product.

BRIEF DESCRIPTION OF THE DRAWINGS

The present invention will be now described, for illustrative but not limitative purposes, according to its preferred embodiments, with particular reference to the figures of the enclosed drawings, wherein:

FIG. 1 shows a transverse vertical view of a first preferred embodiment of a system according to the invention;

FIG. 2 shows a second longitudinal vertical view of the system of FIG. 1;

FIG. 3 shows a transverse vertical view of a section of the system according to the invention;

DETAILED DESCRIPTION OF THE INVENTION

Figure 4:
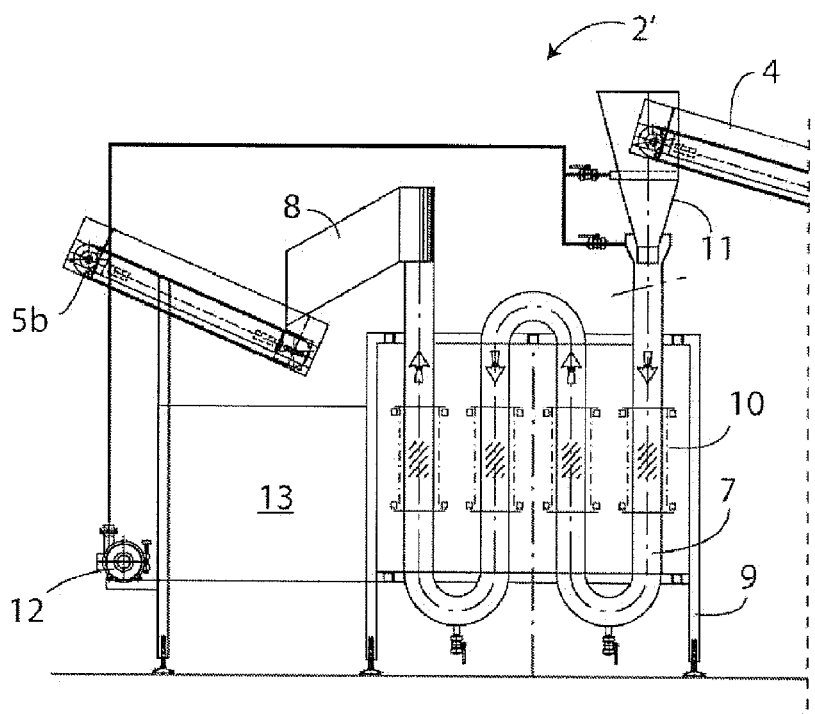
FIG. 4 shows a transverse vertical view of a second preferred embodiment of a system according to the invention.

Making reference to FIGS. 1 and 2, it is possible observing a system 1 for pasteurisation thermal treatment of foodstuffs, particularly leaf products, according to the invention.

Pasteurisation treatment by system 1 is obtained subjecting surface of the foodstuff (not shown in the figures) to a set thermal cycle, having a first heating step and a second cooling step. Said steps occur while said product is immersed within a fluid, typically water or a water-based mixture.

Said steps are respectively followed by a first and a second treatment sections 2 and 3. Said first treatment section 2, heating the product, reduces concentration of thermo-sensitive bacteric flora present on product to be subjected to treatment. Second treatment section 3, cooling the product, prevents growth of residual bacteric flora.

The two sections 2 and 3 comprising the system 1 have the same structural configuration and are cascade assembled, first the heating section 2 and then the cooling section 3.

Said sections 2 and 3 are connected by a conveyor belt 4 transferring the product from one section to the other one.

Observing now in greater detail FIG. 1, it is observed that product 1 is conveyed by a conveyor belt 5a to a hopper 6.

Said hopper 6 is connected to a first end of a washing conduct 7, supported by a support structure 9. Said washing conduct 7 is connected at its second end with a further hopper 8 for discharging the product.

Said conduct 7 is comprised of rectilinear and curvilinear tube sections, aligned or offset each other. Vertical sections of said conduct 7 provide transparent stub pipes 10, by which it is possible controlling the product flow while it passes through the same washing conduct 7.

A Venturi tube recirculation element 11 is present between the hopper 6 and the first end of said washing conduct 7, acting as ejector. Said recirculation element 11 is connected with a treatment water circulation pump 12, pumping water provided within a collection basin 13 into a tube 14, bifurcated so as to connect at the top and at the base of the Venturi tube element 11, thus realising primary and secondary flows of said ejector.

Second cooling section 3 is structurally completely equivalent to the first treatment section 2, comprising a hopper 6', a washing conduct 7', a further hopper 8', a support structure 9', transparent stub pipes 10' on the vertical sections of the washing conduct 7', a Venturi tube recirculation system 11', a treatment water circulation pump 12', connected to a tube 14', and a basin 13'.

Product is withdrawn from cooling section 3 by a belt 5b.

Only the operation of the heating section 2 will be described in the following, since the cooling section 3 is fully equivalent to the heating section 2, but differences that will be indicated in the following.

The product to be subjected to treatment is dosed by the conveyor belt 5a within hopper 6, within which treatment water is circulated by pump 12 through the tube 14.

Water temperature is controlled by a water heating system, not shown in the figures, within the water collection basin 13. it must taken into consideration that, for the cooling section, the heating system is replaced by a cooling system.

Said heating system can be an electric system, a gas system, a glycol system, or other system, with a thermostat to control the water temperature.

Treatment water is injected along with the product within the washing conduct 7 by Venturi tube 11 placed under the product supply hopper 6.

Water vein of this section drags product toward the washing conduct 7. in order to prevent clogging of hopper 6, part of water flow is injected along the perimeter of the same hopper 6. Pulse of the product is such to permit to the same to pass the length of the washing conduct 7.

By this product acceleration system, it is possible maintaining very precise treatment times.

Product flow is separated in the final portion of the washing conduct 7 by the product transferring conveyor belt 4, acting also as separator.

Either said conveyor belt 7 and said discharge means 5b are respectively provided in correspondence of said basin 13, 13' for collection of the treatment fluid both of said first 2 and second 3 treatment sections. It permits collecting water separated from the treated product within said basins 13, 13'.

Said product is heated while passing within the conduct 7 by the heating water, so as to reduce the starting concentration of thermo sensitive bacteric flora in said product.

Cooling within section 3 is obtained by cold water injected by the pump 12' within hopper 6', permitting blocking growth of residual bacteric flora within the product.

It must be considered that heating or cooling fluid can be water or a water-based mixture, suitable to sterilise the product. Treatment by said mixture can be of two kinds:

enzymatic, with the adding of organic acids suitable to an alimentary use; and/or chemical, e.g. with ozone, chlorine, or both, in order to make a decontamination.

It must also be considered that said heating section also permits a cooking and/or scorching of the product.

As already said, transparent stub pipes 10 are provided on vertical sections of washing conduct 7 or 7'. They permit to the operator 15 to monitor product flow within the whole washing conduct 7, 7'.

Finally, it must taken into consideration that it is possible adjusting treatment time in two ways:

adding one or more conduct 7, 7' sections;

adjusting the pump 12 number of revolutions, e.g. by an inverter.

In this last way, it is possible obtaining high precision adjustment levels of treatment time, even with a precision of a second.

FIG. 3 shows a single section 2 or 3 of the system 1, said section can be modularly installed upward or downward one or more other sections of the same kind, thus permitting obtaining complex systems, that can be easily connected with other systems.

Products that can be subjected to treatment by the system 1 according to the invention are different. Besides vegetables and particularly leaf products, it is also possible subjecting to treatment fruit.

Figure 5:
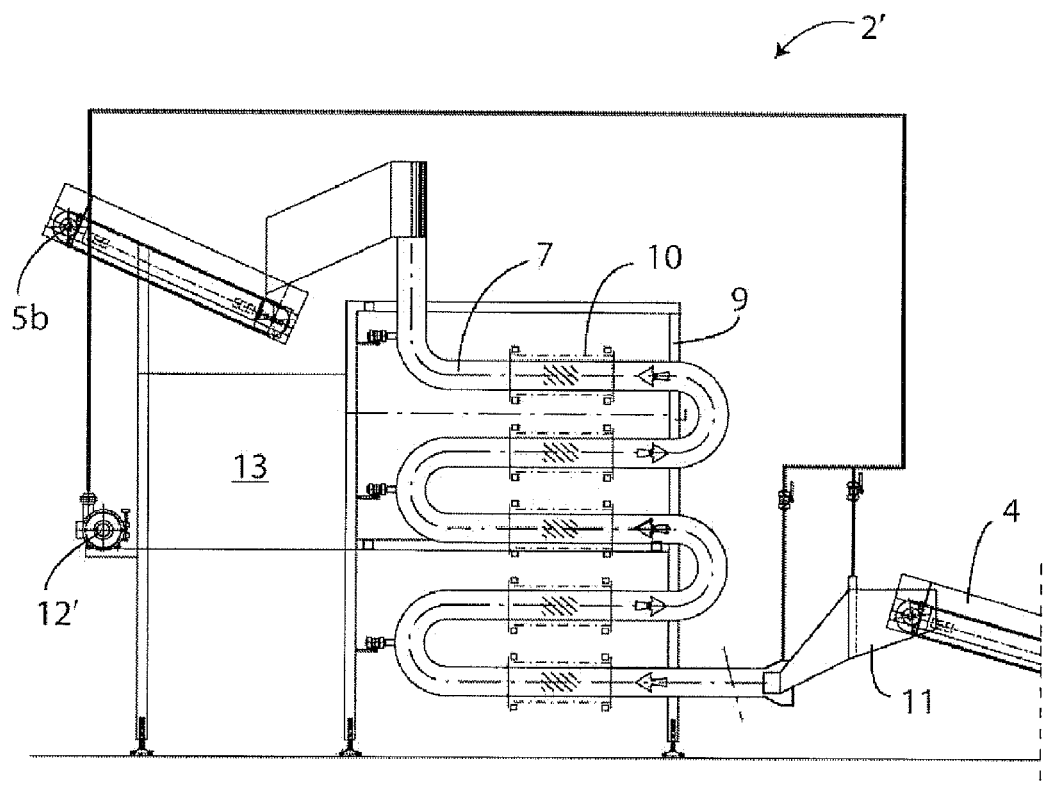
FIG. 5 shows a transverse vertical view of a third preferred embodiment of a system according to the invention.

Coming now to observe FIGS. 4 and 5, there are shown two further embodiments of the system according to the invention. Parts similar to parts shown in the previous FIGS. 1-3 will be indicated by the same reference numbers.

Particularly, FIG. 4 shows a system providing only one treatment section 2', but it is to be understood that the system according to the invention the system can comprise even a number of section higher than two.

Embodiment shown in FIG. 5 provides conducts 7 laid according to a horizontal orientation. The same orientation can be provided in embodiments of FIGS. 1-3 and 4.

Finally, it must be noted that, while treatment time in the heating section has a basic role for product shelf life, cooling section can have a treatment time even much lower, this not influencing shelf life of the product, so that a more or less long exposition of the product to a low temperature does not jeopardise its final features. Therefore, said cooling section, in a further embodiment, can also be a simple basin filled in with cool water, provided with a product withdrawal system.

An advantage of the system according to the present invention is that of being completely modular.

Another advantage of the system according to the present invention is that of being very versatile, being the system suitable to work whole, sliced or cubes, ecc, leaf products.

Another advantage of the system according to the invention is that of making cleaning of surfaces contacting the product, since no inner mechanical part exists.

A further advantage of the system according to the present invention is that of reducing treatment time. Moreover, it must be considered that it is possible increasing working capacity simply adding new modules.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A system for transporting, or washing or pasteurization thermal treatment of foodstuffs, particularly leaf products wherein said system comprises:

loading means for loading a product to be subjected to treatment;

at least one treatment section in which the product to be subjected to treatment is conveyed by said loading means, through which a respective treatment fluid flows;

separating means for separating said product from said treatment fluid and for conveying said product from said at least one treatment section to an outlet, said separating means being provided at the outlet of said at least one treatment section so as to allow only treated product to leave said at least one treatment section;

wherein said at least one treatment section comprises:

a washing conduit, comprised of one or more sections of rectilinear tubes and of one or more corresponding curved tube sections;

a Venturi tube element connected to a first end of said washing conduit; and a pump, connected with said Venturi tube element by a further tube, said pump being suitable to pump said treatment fluid;

wherein said Venturi tube element mixes said product and said treatment fluid pumped by said pump to increase at the same time the speed of the mixture obtained and permits the mixture to reach a second end of said washing conduit.

2. The system according to claim 1, wherein said one or more sections of rectilinear tubes and of one or more corresponding curved tube section is provided according to a vertical orientation.

3. The system according to claim 1, wherein said one or more sections of rectilinear tubes and said one or more corresponding curved tube sections is provided according to a horizontal orientation.

4. The system according to claim 1, wherein said one or more treatment sections comprises a first treatment section, in which the product to be subjected to treatment is conveyed by said loading means, said first treatment section heating said product by a treatment fluid, so as to reduce starting concentration of thereto sensitive bacterial flora present in the same; and a second treatment section, provided in cascade with said first treatment section, said second treatment section cooling the product by said treatment fluid, so as to stop growing of residual bacterial flora present.

5. The system according to claim 4, wherein each one of said first and second treatment sections comprise a respective hopper through which said product is conveyed and wherein each of the washing conduits has an end coupled to one of the respective hoppers, through which said product passes and is washed by a respective treatment fluid at a set temperature; said Venturi tube element being provided between said hopper and said washing conduit.

6. The system according to claim 1, wherein said rectilinear tube sections are aligned with respect to each other and comprise transparent stub pipes suitable to permit to an operator to monitor the product flow within said washing conduit.

7. The system according to claim 1, wherein at least one treatment section comprises at least a collection basin that is positioned such that as the treatment fluid is separated from said product, the treatment fluid is collected within said basin.

8. The system according to claim 1, wherein the system further comprises an inverter connected with said pump, suitable to vary a number of revolutions of said pump and to adjust a flow rate of said treatment fluid, thereby providing a very precise adjusting treatment time of said at least one treatment section.

9. The system according to claim 1, wherein said at least one treatment section comprises a further hopper for discharging said product.

10. The system according to claim 4, wherein the treatment fluid comprises water and enzymes or organic acids or chemical agents suitable for food use.

11. The system according claim 10, wherein said chemical agents comprise ozone, chlorine or a mixture of ozone and chlorine, and are suitable to decontaminate said product.

12. The system according to claim 4, wherein said first treatment section comprises a heating system for said treatment fluid within a collection basin, wherein said heating system is an electric system or a gas system or a glycol system, and comprises a thermostat controlling temperature of said respective treatment fluid.

13. The system according to claim 4, wherein said second treatment section comprises a cooling system for cooling said respective treatment fluid contained within said basin.

14. The system according to claim 1, wherein said product to be subjected to treatment is salad or fruit.

15. The system according to claim 4, wherein said first and second treatment sections are modular sections.

16. The system according to claim 4, wherein said second treatment section comprises a basin filled in with said low temperature treatment fluid, wherein the product arriving from said first treatment section is placed, and said system further includes means for withdrawing the product from the basin.

17. The system according to claim 1, wherein said conveying and separating means comprises a conveyor belt separating said conveyed product from the treatment fluid.

18. The system according to claim 1, wherein for each treatment section, said conveying and separating means is a discharging means.

19. The system according to claim 1, wherein said rectilinear tube sections are offset with respect to each other and comprise transparent stub pipes suitable to permit to an operator to monitor the product flow within said washing conduit.

* * * * *

UNITED STATES PATENT AND TRADEMARK OFFICE
CERTIFICATE OF CORRECTION

| | | |
|---|---|---|
| PATENT NO. | : 8,146,489 B2 | Page 1 of 1 |
| APPLICATION NO. | : 12/777625 | |
| DATED | : April 3, 2012 | |
| INVENTOR(S) | : Turatti | |

It is certified that error appears in the above-identified patent and that said Letters Patent is hereby corrected as shown below:

Please insert the following on the title page:

-- Foreign Application Priority Data
Dec. 27, 2006  (IT) .............................RM2006A0703 --

In the Claims:

In column 6, line 44, please delete "thereto" and replace with "thermo".

Signed and Sealed this
Eighth Day of May, 2012

David J. Kappos
*Director of the United States Patent and Trademark Office*